April 4, 1950
H. A. HULSBERG
2,502,568
TESTING DEVICE FOR THERMOCOUPLE TYPE
TEMPERATURE RECORDERS
Filed June 18, 1948
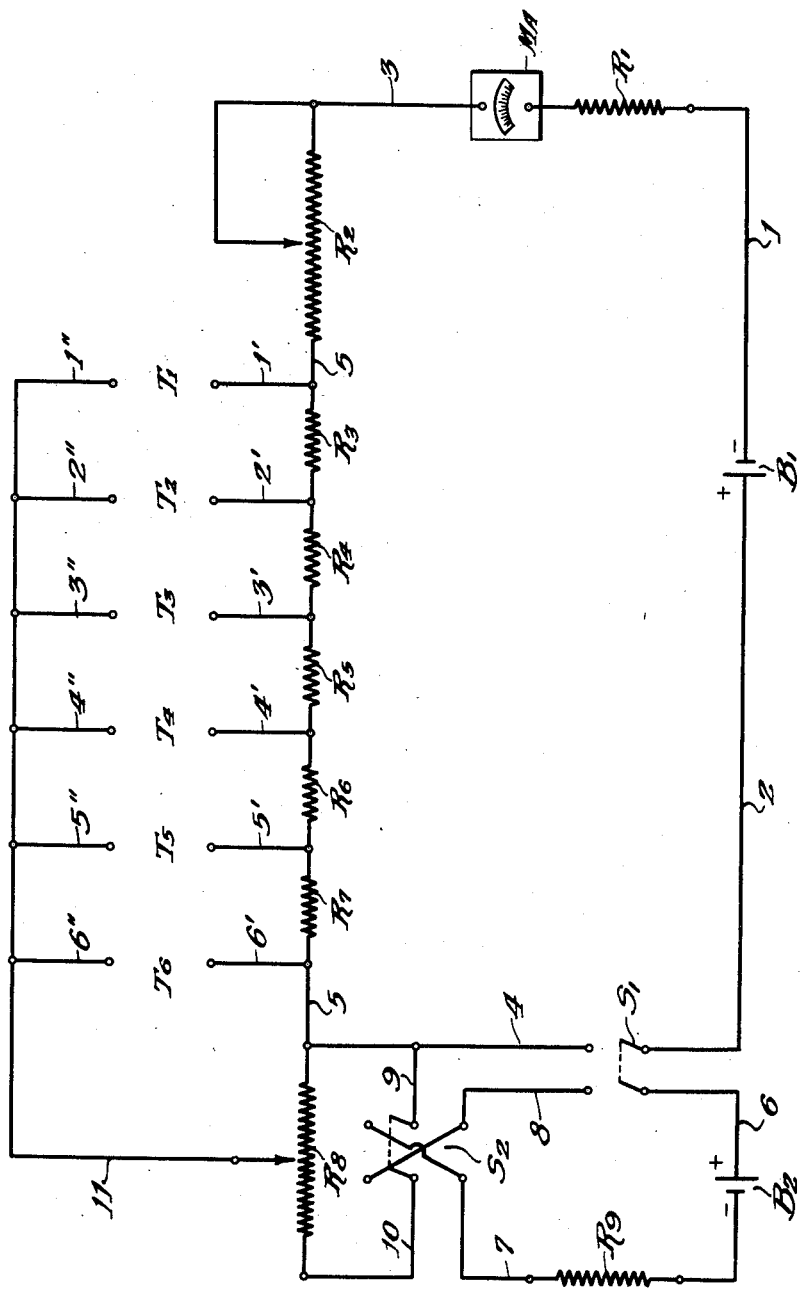
Inventor:
Herbert A. Hulsberg
By: Maynard P. Venema
Attorney:
Philip J. Liggett
Agent Patented Apr. 4, 1950

2,502,568

UNITED STATES PATENT OFFICE 2,502,568

TESTING DEVICE FOR THERMOCOUPLE TYPE TEMPERATURE RECORDERS

Herbert A. Hulsberg, Clarendon Hills, Ill., assignor to Universal Oil Products Company, Chicago, Ill., a corporation of Delaware Application June 18, 1948, Serial No. 33,771

3 Claims. (Cl. 323—79)

1

This invention relates to a device suitable for supplying varying direct current voltages and providing a rapid check of thermocouple type of recorders. The apparatus is particularly adapted for testing the operation of balancing and printing mechanisms within a multi-point thermocouple type of recorder.

Certain delicate and sensitive recording instruments which are used in operating plants should be, and normally are, periodically checked to insure their continued operation and fitness maintaining the proper control and operation of manufacturing or processing procedures. It is desirable, therefore, to have means for testing the general overall performance of these recording type of instruments in a rapid manner and to effect a quick test or analysis of the improper functioning of a given instrument.

It is, therefore, the principal object of the present invention to furnish an electrical operating device which can be connected with a multiple point thermocouple type of temperature recorder to effect a quick check of the overall performance and operation of each of the thermocouple circuits and of the balancing and indicating mechanisms for each circuit of the recorder.

It is also an object of the present device to supply check voltages to an instrument which will simulate actual temperatures over a relatively wide range, corresponding to plus and minus temperatures with reference to normal atmospheric temperatures.

Briefly, the improved device has two voltage dividing electrical circuits and a plurality of pairs of terminals for connection to a multiple point recording instrument, with each of the circuits having a voltage supply and a variable voltage divider, the circuits being connected to one another in a manner to place their voltage outputs in series and the aforesaid plurality of terminals being connected to each of the circuits one-half of the plurality of pairs of terminals being connected to one circuit and the other half to the other of the circuits, fixed resistances placed in one circuit in a manner to have one between each of the terminal take-offs whereby to provide different voltages to each pair of terminals, and a reversing switch in the other of the circuits whereby to effect the addition or suppression of voltage outputs carrying to the terminals from the two circuits.

2

More specifically, the improved multiple point voltage supplying device of this invention comprises two voltage dividing circuits in an electrical network, one circuit having a D. C. voltage supply, a voltage dividing resistor, a current indicator, a plurality of voltage supplying terminals branching from the circuit and fixed resistors between each of the plurality of branches to the terminals, and the second of the voltage dividing circuits having a D. C. voltage supply, a variable voltage dividing resistor, a reversing switch between the voltage supply and the variable resistor, and a plurality of terminals branching from the center tap of the variable resistor in a manner to provide opposing and corresponding terminals for those of the first mentioned circuit and to form therewith a plurality of pairs of voltage supplying terminals, the two circuits being connected to place their voltage outputs in series whereby the second mentioned circuit adds to or suppresses the voltages being supplied to each of the pairs of terminals from the first mentioned circuit.

The electrical network of the device thus includes means for varying the voltage between the successive terminal points, and for varying the magnitude of the voltage output to simulate temperatures both above and below atmospheric temperatures where recorders are calibrated to accommodate such a range.

The accompanying drawing and the following description thereof will serve to show more clearly the operation of the testing device as well as the construction and arrangement, in a diagrammatic manner, of a simplified embodiment of the apparatus.

Referring now to the drawing, there is shown a battery $B_1$ connected into an electrical circuit by means of lines 1 and 2. Line 1 has connected in series a fixed resistor $R_1$ and a milliammeter MA. The milliammeter in turn connects by wire 3 to a variable resistor $R_2$ so that the current flow in the circuit may be controlled to any desired value. The line 2, from the positive terminal of the battery $B_1$, connects with a switch $S_1$ and through the switch to line 4 which in turn joins with line 5 through a series of fixed resistors $R_3$, $R_4$, $R_5$, $R_6$ and $R_7$ and in turn connects with the other end of the variable resistor $R_2$ to form a completed circuit. Branching from line 5, between each of the fixed resistors, are a plurality of branch lines 1', 2', 3', 4', 5' and 6', which in turn terminate to form one-half of each of the voltage supply terminals $T_1$, $T_2$, $T_3$, $T_4$, $T_5$ and $T_6$. The particular embodiment illustrated thus provides means for supplying a variable voltage to six terminals and is suitable for accommodating simultaneously six thermocouples of a multi-point temperature recorder. The invention is, of course, not limited to any particular number of terminals and may be constructed and arranged to accommodate a greater or lesser number of thermocouples at one time.

Adjoining the aforedescribed circuit there is a second circuit having a D. C. voltage supplied by battery $B_2$ through lines 6 and 7. Line 6 connects with the positive terminal of the battery and to the operating switch $S_1$ and through the switch to line 8 which in turn connects with a reversing switch $S_2$. The line 7 has a fixed limiting resistor $R_9$ and connects with another terminal of the reversing switch $S_2$. The opposing terminals of the reversing switch connect through lines 9 and 10 respectively to line 4 of the first described circuit and to a variable resistor $R_8$. The tap of adjustable resistor $R_8$ has a connecting line 11 from which branch in a parallel manner, the lines 1'', 2'', 3'', 4'', 5'' and 6''. These lines thus provide the other half of each of the plurality of pairs of terminals $T_1$ to $T_6$.

In operation, the switch $S_1$ connects the batteries $B_1$ and $B_2$ into the electrical circuit, battery $B_1$ sending current through the variable resistor $R_2$ and the milliammeter MA so that the current output can be controlled to a proper intensity for the particular recorder which is to be checked. Normally, the current intensity used will be small, being of the order of but a few milliamperes and the batteries need only furnish a small voltage, of the order of 1.5 volts. In the second circuit, supplied by battery $B_2$, the reversing switch $S_2$ permits altering the direction of current flow through the variable resistor $R_8$, thus, this circuit provides a suppression type of circuit which may subtract or add to the voltages produced by the series of resistors $R_3$ to $R_7$ and current in the adjoining circuit, supplied by battery $B_1$. Thus, the voltages may be shifted to a plus or minus voltage corresponding to voltages generated by thermocouples of the instrument being tested as at plus or minus temperatures as referred to normal atmospheric temperatures. The fixed resistors $R_1$ and $R_9$ in this embodiment, serve only as limiting resistors, preventing excessive voltages to the thermocouples of an instrument, excessive current through the milliammeter, and excessive battery current drain.

As a specific example of the operation of the device, let it be assumed that each of the fixed resistors $R_3$ to $R_7$ are 2 ohm resistors and that $R_2$ is adjusted to furnish a current flow through the milliammeter of one milliampere. Thus, without considering the voltage from battery $B_2$ and through variable resistor $R_8$, the voltage drop to terminal $T_1$ will be 10 millivolts, and the voltage drop at terminal $T_5$ would be 2 millivolts, being effected only by the one resistor $R_7$. However, in addition, assume $R_8$ is adjusted to have 5 ohms of resistance on the left side of its slider and a current of 3 milliamperes flowing therethrough in the same direction as the current flow in the other resistors $R_3$ to $R_7$; the direction of the current flow being controlled by the reversing switch $S_2$. Thus, the voltage across terminals $T_6$ would be 15 millivolts and the successive voltages being supplied to the terminals $T_5$ to $T_1$ would be respectively, 17 millivolts, 19 millivolts, 21 millivolts, 23 millivolts, and 25 millivolts.

In another test operation, assuming the same current flows and resistance values, where the switch $S_2$ is reversed to cause the current flow through resistor $R_8$ to oppose that through the fixed resistor $R_3$ to $R_7$, then the voltage at $T_6$ would be −15 millivolts, and from $T_5$ through $T_1$, −13 millivolts, −11 millivolts, −9 millivolts, −7 millivolts and −5 millivolts respectively.

The voltage spread between the plurality of terminals may be varied by in turn varying the current intensity from $R_2$, and indicated by the milliammeter MA. In other words, for fixed resistances $R_3$ to $R_7$, varying millivoltage drops may be obtained by varying the current intensity. In the suppression circuit, the variable resistor $R_8$ may be moved and controlled to provide higher or lower voltage drops, while the switch $S_2$ may be varied to provide a change in polarity and to supply a plus or minus suppression with respect to the other circuit.

It is thus evident that the great advantage of this device is that it provides an easily operated and effective means of testing the overall operation of a multipoint thermocouple temperature recorder. The apparatus is not intended as a calibrating device, since other electrical equipment is more suitable for calibrating each thermocouple of a recording instrument, but the device does provide a visual means of noting whether the mechanical portions, such as the recording and printing mechanisms of an instrument, are in apparent good working order.

I claim as my invention:

1. A testing device suitable for providing a variable polarity and variable voltages to a multipoint recording instrument, said device having two voltage dividing circuits in an electrical network and a plurality of pairs of terminals therefrom for connection to said multipoint instrument, each of said circuits having a voltage supply and a variable voltage divider, with said circuits being connected to one another to place the voltage outputs in series, terminal take-off leads connecting to each of said circuits to form said plurality of pairs of terminals, a plurality of fixed resistances in one circuit, one of said fixed resistances between each of the terminal take-offs from that circuit for effecting different voltages to each pair of terminals, and a reversing switch in the other of said circuits providing thereby an optional polarity and addition or suppression of voltage with respect to the other circuit.

2. A testing device for providing a variable polarity and variable voltage supply to a multipoint recording instrument, said device comprising two voltage dividing electrical circuits interconnected to place their voltage outputs in series, and each of said circuits having a voltage source and an adjustable voltage divider, one circuit having a plurality of terminals branching therefrom in a parallel arrangement and a plurality of fixed resistances, with one resistance between each of the branching terminals, the second of said circuits having a plurality of terminals branching from the tap of the adjustable voltage divider therein and providing thereby together with the terminals of first said circuit a plurality of voltage supplying pairs of terminals, and a reversing switch in said second circuit connected therein to change the polarity of the voltage output from the latter with respect to the voltage output of the first said circuit.

3. A multiple point voltage supplying and testing device, comprising two voltage dividing circuits in an electrical network, one circuit having a D. C. voltage supply, an adjustable voltage dividing resistor, a current indicator, a plurality of fixed resistors connected in series therein, and a plurality of voltage supplying terminals branching from said circuit, one terminal branching between each of the plurality of fixed resistors, the second of said voltage dividing circuits having a D. C. voltage source, an adjustable voltage dividing resistor, a reversing switch between the voltage and said resistor, and a plurality of terminals branching from the tap of last said variable resistor providing thereby opposing and corresponding terminals for those of first said circuit and to form therewith a plurality of pairs of voltage supplying terminals, said second circuit being connected to first said circuit to place the voltage outputs of each circuit in series, and said reversing switch connected in said second circuit to vary the polarity therefrom to add or to suppress the voltage output with respect to the first said circuit.

HERBERT A. HULSBERG.

No references cited.